United States Patent
Cha et al.

(10) Patent No.: US 10,377,316 B2
(45) Date of Patent: Aug. 13, 2019

(54) POP-UP CONSOLE FOR VEHICLE

(71) Applicants: Hyundai Motor Company, Seoul (KR); Kia Motors Corporation, Seoul (KR)

(72) Inventors: Dong Eun Cha, Seongnam-si (KR); Keun Sig Lim, Yongin-si (KR); Hye Kyung Kim, Suwon-si (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/809,326

(22) Filed: Nov. 10, 2017

(65) Prior Publication Data

US 2018/0281689 A1 Oct. 4, 2018

(30) Foreign Application Priority Data

Apr. 3, 2017 (KR) .......................... 10-2017-0042839

(51) Int. Cl.
*B60R 7/04* (2006.01)
*G06F 1/16* (2006.01)
*B60R 16/03* (2006.01)

(52) U.S. Cl.
CPC ............... *B60R 7/04* (2013.01); *B60R 16/03* (2013.01); *G06F 1/1656* (2013.01)

(58) Field of Classification Search
CPC .......... B60R 7/04; B60R 16/03; G06F 1/1656

USPC ....................................................... 296/24.34
See application file for complete search history.

(56) References Cited

U.S. PATENT DOCUMENTS

| 6,203,088 | B1 | 3/2001 | Fernandez et al. |
| 2008/0122239 | A1* | 5/2008 | May .................. B60R 1/008 296/24.34 |
| 2011/0215606 | A1* | 9/2011 | Trivedi .................. B60N 3/00 296/24.34 |
| 2013/0057011 | A1* | 3/2013 | Yamagishi ................ B60R 7/04 296/24.34 |
| 2014/0167438 | A1* | 6/2014 | Lambert ................. B60R 16/02 296/24.34 |

FOREIGN PATENT DOCUMENTS

| JP | 2012-517795 | 8/2012 |
| JP | 2012-236477 | 12/2012 |
| KR | 10-2002-0095496 A | 12/2002 |
| KR | 10-1502943 | 3/2015 |

* cited by examiner

*Primary Examiner* — Joseph D. Pape
(74) *Attorney, Agent, or Firm* — Morgan, Lewis & Bockius LLP

(57) ABSTRACT

A pop-up console apparatus for a vehicle may include a console housing disposed in a vehicle; a cover device disposed on the console housing to cover or pop open a top portion of the console housing; and one or more lower trays sequentially disposed under the cover device, wherein at least one of the lower trays moves up and down along a guide that is coupled to an end portion of the cover to pop up together with the cover while being inserted into the console housing.

13 Claims, 4 Drawing Sheets

POP-UP CONSOLE FOR VEHICLE

CROSS REFERENCE TO RELATED APPLICATION

The present application claims priority to Korean Patent Application No. 10-2017-0042839, filed on Apr. 3, 2017, the entire contents of which are incorporated herein for all purposes by this reference.

BACKGROUND OF THE INVENTION

Field of the Invention

The present invention relates to a pop-up console for a vehicle. More particularly, the present invention relates to a pop-up console for a vehicle wherein the pop-up console includes a cover device disposed on the console and a plurality of lower trays providing storage spaces at different heights and being able to move up and down along one guide such that the state of a vehicle and the charging states of mobile phones in the lower trays can be recognized through a display of the cover device.

Description of Related Art

In general, a console of a vehicle has a rotational structure that opens and closes a tray with a cover that is rotated about a hinge shaft. Furthermore, there is a multi-step console including these consoles.

Recently, not only the function as a simple storage space, but various integrated functions are required for automotive consoles. Furthermore, a function of improving the internal esthetic appearance of vehicles is also required for automotive consoles.

As a related art, FIG. 1 schematically shows a multi-step console having a rotational structure.

According to the multi-step console, a lower tray 11 with an open top is formed inside a vehicle, an upper tray 12 with an open top is disposed over the lower tray 11, and the open top of the upper tray 12 is covered with a cover 13. The rear lower end portion of the upper tray 12 is hinged to be rotatable to the rear upper portion of the lower tray 11 and the rear lower end portion of the cover 13 is hinged to be rotatable to the rear upper portion of the upper tray 12.

However, in the related art, automotive consoles including a multi-step tray can merely perform a simple storage function, so it is impossible to provide various functions recently required for vehicles.

Furthermore, since the multi-stage tray shown in FIG. 1 protrudes out of a console housing, it deteriorates the internal esthetic appearance of vehicles.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing integrated information including a memo, relationships with mobile devices, and the charged amount of mobile devices on a console cover by providing a display to the cover.

Various aspects of the present invention are directed to providing a multi-step console that selectively exposes the inside through a cover of which the transparency is controlled in accordance with a request from a user.

Various aspects of the present invention are directed to providing a cover that is inserted in a console housing.

The aspects of the invention are not limited to the described above, and other features and advantages of the present invention stated herein may be easily understood from the following description and may be made clear by embodiments of the present invention. Furthermore, the aspects of the present invention can be achieved by the components described in claims and combinations of them A pop-up console for a vehicle for achieving the objects of the present invention includes the following configurations.

The pop-up console for a vehicle may include a console housing disposed in a vehicle; a cover device disposed on the console housing to cover or pop open a top portion of the console housing; and one or more lower trays sequentially disposed under the cover device, wherein at least one of the lower trays moves up and down along a guide that is coupled to an end portion of the cover to pop up with the cover while being inserted into the console housing.

The cover device may include: a touch panel for recognizing user input; a transparent display disposed under the touch panel to display information according to a user's request; and an electric frost glass disposed under the transparent display.

The touch panel may have a function of recognizing electronic handwriting.

Transparency of the cover device may be determined through the electronic frost glass.

Information related to a mobile device under the cover device may be displayed through the display.

The transparent display may be selected from the group including an LCD, an Organic Light-Emitting Diode (OLED), and a transparent OLED.

The guide may further include stoppers for setting up and down paths for the lower trays.

The pop-up console may further include an elastic member providing tension in a pop-up direction when the guide is positioned inside the console housing.

At least one of the lower trays under the cover device may include a wireless charging tray.

The wireless charging tray may include a contact or non-contact wireless charging system.

The lower trays may be at least two or more lower trays.

The at least two or more lower trays are adjacent to each other and move together when at least one thereof moves.

The present invention can produce the following effects from the embodiments, and the configurations and combination and use relationships to be described below.

Since various aspects of the present invention are directed to providing a pop-up console for a vehicle that includes a multi-tray, more storage spaces can be provided for a user.

Furthermore, various aspects of the present invention are directed to providing a console that allows a user to check various items of information all at once through the cover device including the display.

Furthermore, the present invention improves the internal esthetic appearance of a vehicle because the cover device can be stowed in the console housing.

The methods and apparatuses of the present invention have other features and advantages which will be apparent from or are set forth in more detail in the accompanying drawings, which are incorporated herein, and the following

Figure 1:
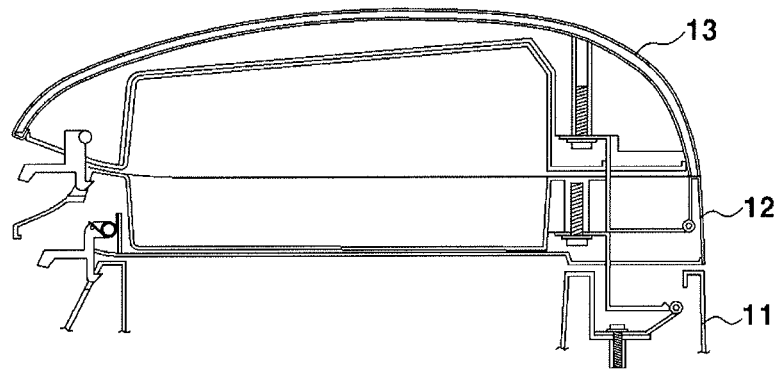
FIG. 1 is a side view showing an automotive multi-step console having a rotational structure in the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Furthermore, in the specification, the terms "~unit" and "~system" mean one device for processing at least one function or operation and may be achieved by hardware, software, or a combination of hardware and software.

Discriminating the names of components with the first, and the second, etc. in the following description is for discriminating them for the same relationship of the components and the components are not limited to the order in the following description.

Various aspects of the present invention are directed to providing a pop-up console 100 for a vehicle wherein the pop-up console 100 includes a center console structure that is inserted in a console housing 200. Furthermore, the pop-up console 100 for a vehicle includes a cover device 110 popping up along a guide 130, and a plurality of lower trays 120.

An exemplary embodiment of the present invention further includes a touch panel 111, and a combination relationship of the pop-up console 100 for a vehicle that can perform a wireless charging function will be described below.

Figure 2:
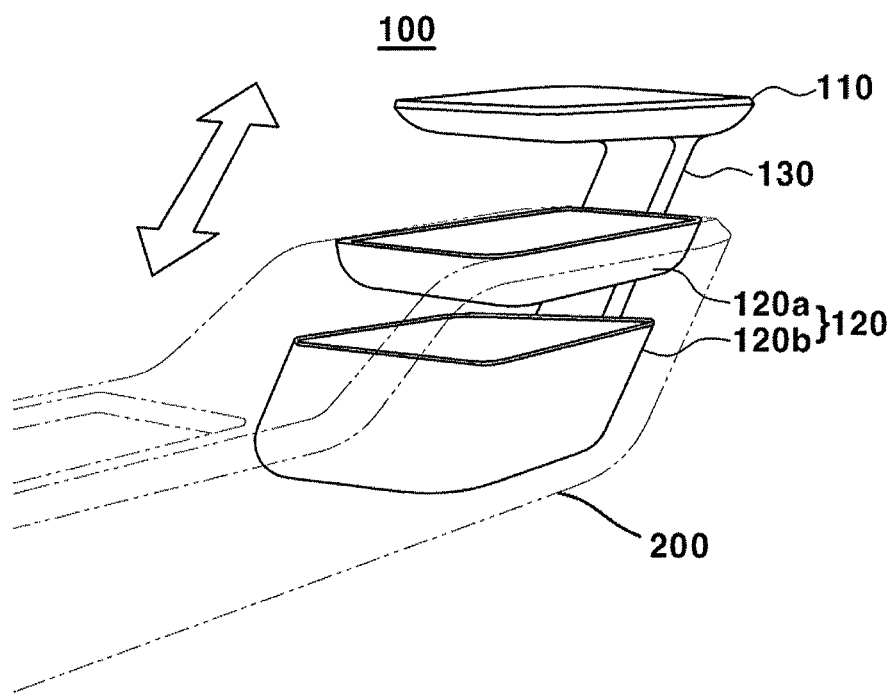
FIG. 2 is a perspective view showing a pop-up console for a vehicle according to an exemplary embodiment of the present invention.

FIG. 2 is a perspective view showing the pop-up console 100 for a vehicle according to an exemplary embodiment of the present invention.

As shown in the figures, various aspects of the present invention are directed to providing a configuration that is inserted in a console housing 200 and popped-up in accordance with a request from a user and includes the console housing 200, the cover device 110 covering the top portion of the console, and the lower trays 120 sequentially disposed under the cover device 110.

The console further includes the guide that is coupled to an end portion of the cover device 110 and applies a predetermined force to pop-up the cover device 110 and at least one of the lower trays 120 moves up and down along the guide 130.

The guide 130 includes an elastic member 160 that provides a predetermined tension when the cover device 110 is stowed in the console housing 200, and the elastic member 160 may be disposed under the guide 130 to provide elasticity for popping-up the cover device 110.

Furthermore, the guide 130, which allows the cover device 110 to pop up upward from the console housing 200, may be inclined at a predetermined angle in the front and rear direction from a line perpendicular to the console housing 200 to prevent interference with the console housing 200 when the cover device 110 pops up.

The cover device 110 is inserted in the console housing 200 when it is closed, and the center console may be maintained at the same height as the console housing 200 until the cover device 110 is opened in accordance with a request from a user.

Figure 3:
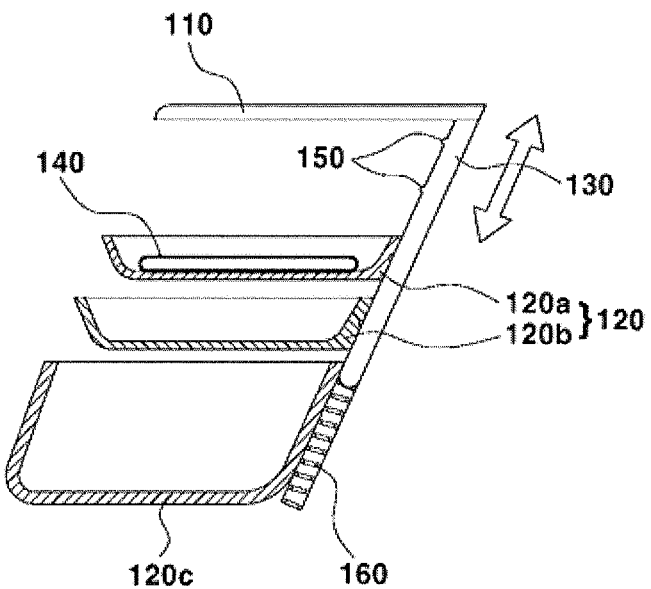
FIG. 3 is a vertical cross-sectional view when a first lower tray of the pop-up console for a vehicle according to an exemplary embodiment of the present invention is open.

FIG. 3 is a side view when the cover device 110 pops up In accordance with various exemplary embodiments of the present invention.

As shown in the figure, the cover device 110 in an exemplary embodiment of the present invention pops up upward from the console housing 200, and the guide 130 coupled to an end portion of the cover device 110 also pops up to move upward with the cover device 110. Furthermore, when the cover device 110 is opened, the first lower tray 120a under the cover device 110 may be opened.

After the cover device 110 pops up, the height of the cover device 110 can be adjusted by a stopper on the guide 130, and the stopper may be disposed at an opening for sliding of the guide 130 of the console housing 200 to set the pop-up height of the guide 130.

A wireless charging system 140 may be provided to charge a mobile device when the first lower tray 120a is opened (wireless charging tray) to charge a mobile device in the first lower tray 120a. The wireless charging system 140 can charge mobile devices within a predetermined distance, that is, it can charge mobile devices in the first lower tray 120a and the second lower tray 120b.

Furthermore, the wireless charging system 140 allows electrical devices in the console to be used without wires and allows mobile devices to be simultaneously operated without specific power lines. The wireless charging system 140 may be a contact type or a non-contact type. When the wireless charging system 140 is a non-contact type, it has a transmission range of several millimeters to several centimeters and can charge mobile devices within a predetermined distance from the first lower tray 120a.

A local non-contact energy transmission technology can use inductive coupling via wireless power transmission technology to wirelessly transmit energy to a desired device, and may include an energy transmission type that uses electromagnetic interaction of currents between two facing metal coils.

The wireless charging system 140 may be a resonance type, which wirelessly transmits power to a predetermined distance using a resonance power transmission principle.

The wireless charging system 140 may wirelessly transmit power using RF/microwave radiation, which transmits energy by converting power energy into microwaves, which are advantageous for wireless transmission.

Figure 4:
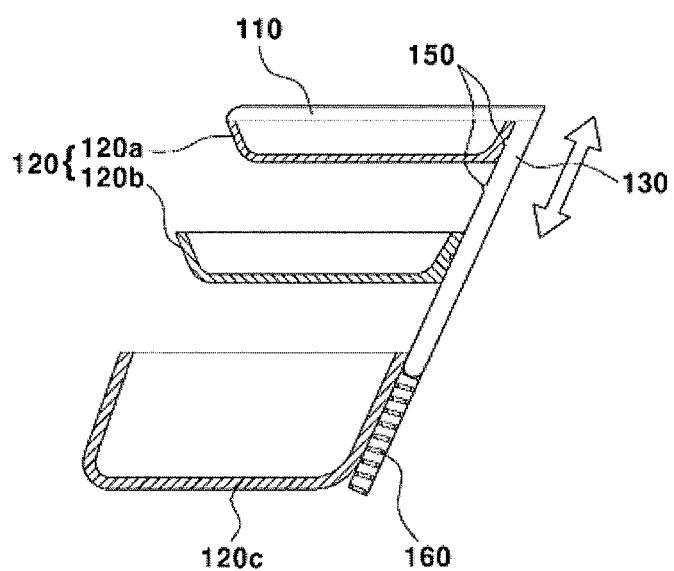
FIG. 4 is a vertical cross-sectional view when a second lower tray of the pop-up console for a vehicle according to an exemplary embodiment of the present invention is open.

FIG. 4 is a vertical cross-sectional view when the second lower tray 120*b* is open In accordance with various exemplary embodiments of the present invention.

As shown in the figure, when the first lower tray 120*a* is moved up along the guide 130 to come in contact with the bottom portion of the cover device 110, the second lower tray 120*b* pops up. When the first lower tray 120*a* is moved to the bottom portion of the cover device 110, the second lower tray 120*b* can move to the same height as the opening of the console housing 200.

That is, the first lower tray 120*a* and the second lower tray 120*b* may be mechanically moved so that they can move different heights, and an actuator may be further provided to move the lower trays along the guide 130 in response to an electrical signal.

Furthermore, the lower trays may be simultaneously moved along a rail in the guide 130. At least one of the lower trays that are sequentially positioned adjacent to one another may move by another one, and as such the lower trays may be set to move different distances.

Figure 5:
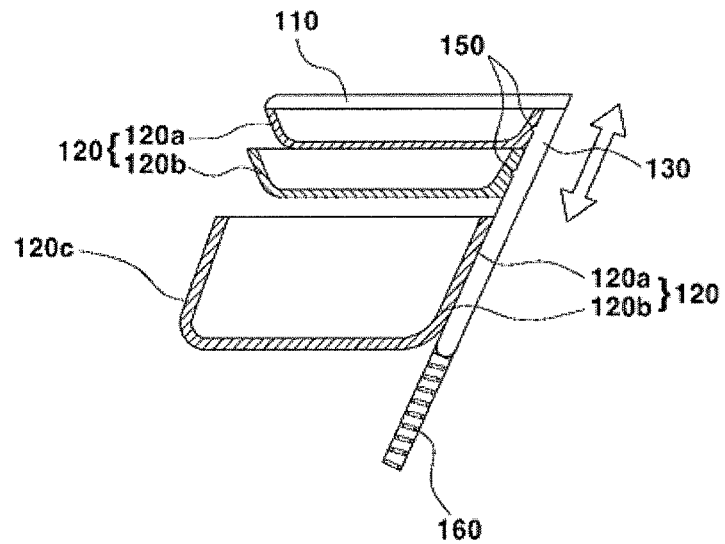
FIG. 5 is a vertical cross-sectional view when a third lower tray of the pop-up console for a vehicle according to an exemplary embodiment of the present invention is open.

FIG. 5 is a vertical cross-sectional view when a third lower tray 120*c* is open In accordance with various exemplary embodiments of the present invention.

When the second lower tray 120*b* is moved to the bottom portion of the first lower tray 120*a*, the third lower tray 120*c* in the console housing 200 is moved up such that the opening of the third lower tray 120*c* is positioned at the same height as the opening of the console housing 200.

That is, when the opening of the second lower tray 120*b* is moved up to the bottom portion of the cover device 110 along the guide 130 from the height of the opening of the console housing 200, the third lower tray 120*c* is moved up such that the opening is positioned at the same height as the opening of the console housing 200.

As described above, the lower trays adjacent to each other are integrally moved and move different distances along the guide 130. When a lower tray is moved along the guide 130, another lower tray adjacent to the bottom portion of the upper one can move in the same direction along the guide 130.

Furthermore, the guide 130 may have a plurality of stoppers for fixing the lower trays at predetermined positions on the guide 130.

The stopper 150 may be formed on the side, which faces the lower trays, of the guide 130 and can be inserted in a side of each of the lower trays to fix them.

The stoppers 150 may be formed to correspond to the lower trays, respectively, a lower tray that does not correspond to the stoppers 150 can move without being fixed by the stoppers 150.

That is, a stopping portion including a groove, a locking portion, or a projective portion corresponding to each of the stoppers 150 is formed at the lower trays, so movement of the lower trays can be restricted by the stopper 150 formed at predetermined positions on the guide 130 to correspond to the lower trays.

Figure 6:
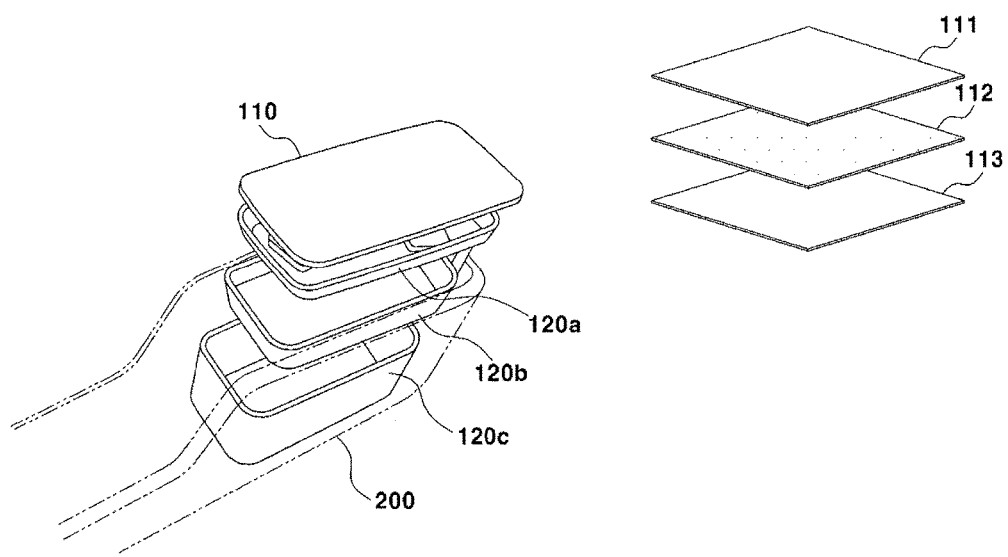
FIG. 6 is a view showing a cover device of the pop-up console for a vehicle according to an exemplary embodiment of the present invention.

FIG. 6 shows layers of the cover device 110 of the pop-up console 100 for a vehicle of the present invention.

As shown in the figure, the cover device 110 in an exemplary embodiment of the present invention includes a touch panel 111 at the uppermost layer facing the internal of a vehicle, and sequentially further includes a display 112 and an electric frost glass 113.

The touch panel 111 is used as an input device for the display and inputs instructions or graphic information intended by a user by generating a voltage or current signal corresponding to a position pressed by a stylus pen or a finger. The touch panel 111 may be a resistive touch screen that is disposed on a display device of flat display devices and uses an analog input type.

Accordingly, the cover device 110 including the touch panel 111 functions as an input device for a user such that a user can input memos, click icons, and input instructions through the display.

The display 112 under the touch panel 111 may be an LCD, OLED, or a TOLED, and may be any type of transparent display.

The display 112 can be operated with a microprocessor of the vehicle, so it can display the state information related to the vehicle and can display applications that can be executed in a mobile device or icons for executing the applications by operating in combination with the mobile device.

The display 112 may control the equipment in a vehicle including an air conditioning system an AVN system, a trunk opening/closing system, a lighting system, a CMS (Camera Monitoring System), a parking system, and ambient system by operating in combination with a microprocessor control circuit in the vehicle.

Furthermore, the display 112 can display the state information related to a mobile device including the charged amount or necessary time for fully charging the mobile device by operating in combination with the wireless charging system 140 and a mobile device that may be put in the first lower tray 120*a*, and can display a list of software that can be executed through the mobile device.

That is, the display 112 of the present invention can display information that is required by a user by operating in combination with a mobile device and a microprocessor in a vehicle, so a user can easily control the mobile device and the control by operating the console cover device 110.

A microprocessor for controlling the pop-up console 100 including the touch panel 111 and the display may be disposed in the console housing 200. The microprocessor may be integrated with the console housing 200 in the manufacturing process.

The microprocessor may include a control circuit and a wireless transceiver. The control circuit may include a wireless communication module for processing signals to be transmitted or signals received through the wireless transceiver and may provide a wireless network with a plurality of controllers (microprocessor) of the vehicle and a mobile device.

The wireless network may be the internet, a wide area network, a local network, a satellite network, a communication network, a personal network, Bluetooth, and combinations of them.

The electric frost glass 113 of the cover device 110 has variable transparency depending on input voltage or current. That is, the transparency of the cover device 110 of the console can be controlled in accordance with a request from a user, so the components inside the console can be blocked.

Figure 7:
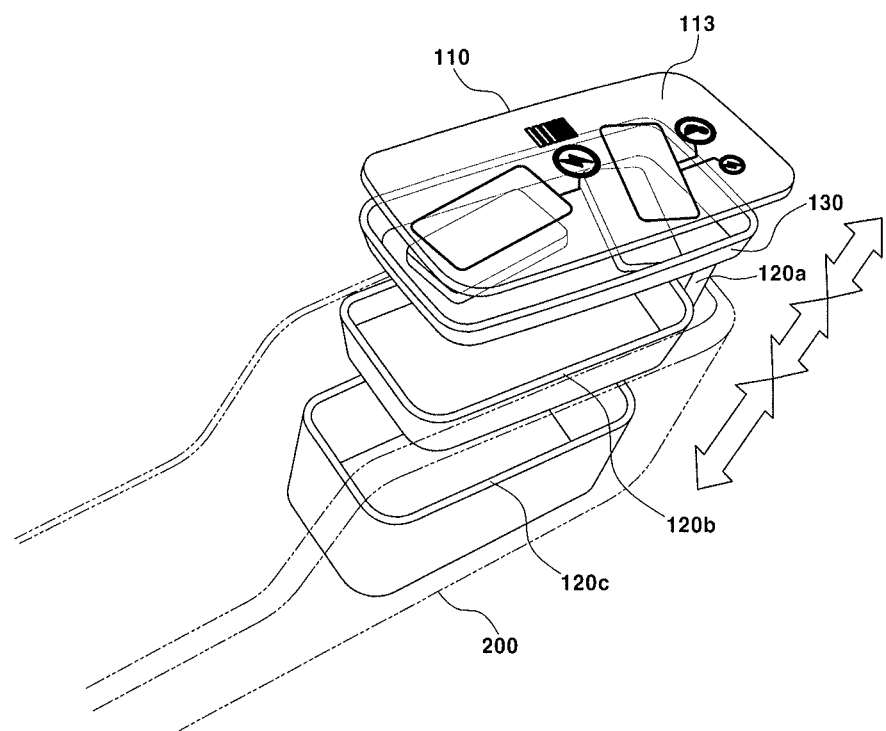
FIG. 7 is a view showing a display function of the cover device of the pop-up console for a vehicle according to an exemplary embodiment of the present invention.

FIG. 7 shows an information window on the cover device 110 when a mobile device is wirelessly charged In accordance with various exemplary embodiments of the present invention.

When one or more mobile devices are placed in the first lower tray 120a, the wireless charging system 140 in the first lower tray 120a recognizes the mobile devices and charges them in a contact or non-contact type.

During the wireless charging, the cover device 110 including the display 112 can display information including the charged mount or the charging time of the mobile devices.

Furthermore, an execution icon for wireless connection with each of mobile devices may be set on the display 112 of the cover device 110 of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the locations of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pop-up console for a vehicle, the pop-up console apparatus comprising:
   a console housing disposed in the vehicle;
   a cover device disposed on the console housing to cover or pop open a top portion of the console housing;
   one or more lower trays sequentially disposed under the cover device; and
   a guide inserted in the console housing to pop up with the cover device,
   wherein at least one of the one or more lower trays moves along the guide, and
   wherein the cover device and the one or more lower trays pop-up along with the guide while maintaining a constant angle with respect to the console housing.

2. The pop-up console apparatus of claim 1, wherein the cover device includes:
   a touch panel for recognizing user input;
   a transparent display disposed under the touch panel to display information according to the use input; and
   an electric frost glass disposed under the transparent display,
   wherein the cover device includes the touch panel at an, uppermost layer facing the interior of a vehicle, and further includes the display under the touch panel and the electric frost glass under the display.

3. The pop-up console apparatus of claim 2, wherein the touch panel is configured for recognizing electronic handwriting.

4. The pop-up console apparatus of claim 2, wherein transparency of the cover device is configured to be set through the electronic frost glass.

5. The pop-up console apparatus of claim 2, wherein information related to a mobile device in the console apparatus is configured to be displayed through the transparent display.

6. The pop-up console apparatus of claim 2, wherein the transparent display includes an LCD, an Organic Light-Emitting Diode (OLED), or a transparent OLED.

7. The pop-up console apparatus of claim 1, wherein the guide further includes stoppers fixing positions of the one or more lower trays.

8. The pop-up console apparatus of claim 1, further including an elastic member providing tension to the guide in a pop-up direction when the guide is disposed inside the console housing.

9. The pop-up console apparatus of claim 1, wherein at least one of the one or more lower trays under the cover device includes a wireless charging tray.

10. The pop-up console apparatus of claim 9, wherein the wireless charging tray includes a contact or non-contact wireless charging system.

11. The pop-up console apparatus of claim 1, wherein the one or more lower trays comprises two lower trays.

12. The pop-up console apparatus of claim 2, wherein a mobile device in the console is configured to be controlled through the display.

13. The pop-up console apparatus of claim 2, wherein equipment in the vehicle is configured to be controlled through the display.

* * * * *